May 7, 1935.  J. W. MOORE  2,000,782
STEAM WRAPPING SEALER
Original Filed Aug. 14, 1933   2 Sheets-Sheet 1
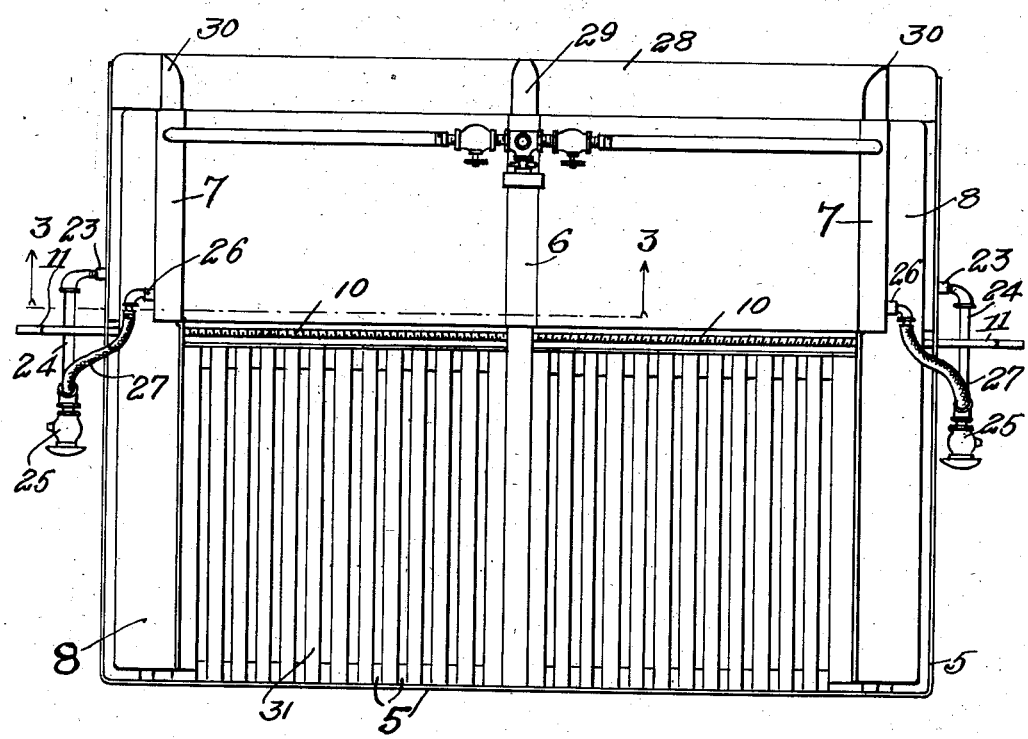
INVENTOR.
Joseph W. Moore.
BY
E. E. Vrooman & Co.,
His ATTORNEYS.

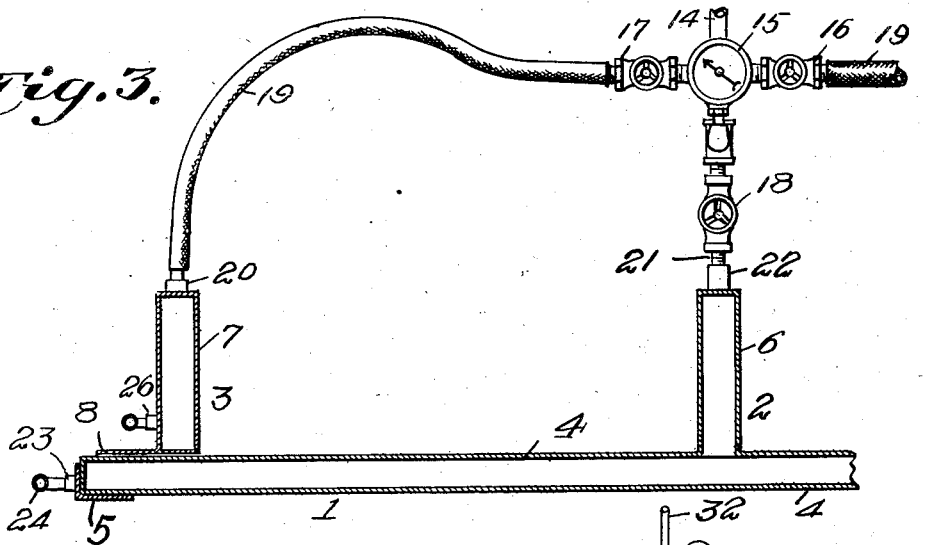

Patented May 7, 1935

2,000,782

UNITED STATES PATENT OFFICE 2,000,782

STEAM WRAPPING SEALER

Joseph W. Moore, Bristol, Va.

Application August 14, 1933, Serial No. 685,141
Renewed March 2, 1935

1 Claim. (Cl. 93—2)

This invention relates to a steam wrapping sealer, especially adapted for the sealing of wrappers on loaves of bread.

An object of my invention is the construction of a simple and efficient steam heated wrapper sealing apparatus.

Another object of the invention is the construction of an apparatus which can be adjusted for sealing the wrappers of different size loaves.

A further object of the invention is the construction of a simple and comparatively inexpensive sealer which can be easily placed in a shop, and which can also be heated by steam at a minimum expense.

With the foregoing and other objects in view, my invention comprises certain novel constructions, combinations and arrangements of parts as will be hereinafter fully described, illustrated in the accompanying drawings, and more particularly pointed out in the appended claim.

In the drawings:

Figure 1 is a view in front elevation of an apparatus constructed in accordance with the present invention, while Figure 2 is a top plan view of the same.

Figure 3 is an enlarged sectional view taken on line 3—3, Fig. 2, and looking in the direction of the arrows.

Figure 4 is an end view of the apparatus.

Figure 5 is an enlarged fragmentary sectional view of the apparatus showing particularly one of its screw threaded shafts and its co-operating parts.

Figure 6 is a perspective view, in general diagram of another embodiment of the present invention.

Referring to the drawings by numerals, 1 designates the base heating unit, 2 is the central heating unit and 3—3 are the adjustable end heating units.

The base heating unit 1 comprises a hollow casing 4 (Fig. 3), which is suitably supported by an angle iron frame 5. In the center of the casing 4 is a vertical hollow casing 6, constituting said central heating unit 2.

Each adjustable end heating unit 3 comprises a vertical, hollow casing 7 (Fig. 3) which is secured to a sliding plate 8. On the under face of plate 8 are two spaced threaded extensions 9—9 (Fig. 5), through which is threaded a shaft 10. Shaft 10 extends outwardly through the angle iron frame 5, and on its outer end is provided with a crank handle 11. The inner end of the shaft 10 is journalled in one of the central lugs 12, with a cotter pin 13 holding the shaft against displacement. Therefore, it will be seen that when screw threaded shaft 10 is manually rotated, the plate 8 and its casing 7 will be adjusted with respect to the fixed central heating unit 2 whereby the apparatus can be quickly adjusted to accommodate loaves of different lengths or sizes.

Steam is supplied to the heating units through the main steam supply hose or pipe 14, which is suitably connected to gage 15. From gage 15 steam is supplied to the valves 16, 17 and 18. A pair of steam hose 19 are connected at their inner ends to valves 16 and 17 with their outer ends suitably connected to inlets 20 on the casings 7. A pipe or hose 21 connects valve 18 to the inlet 22 on casing 6. Therefore, it will be readily understood that steam can be admitted freely to any one or all of the heating units at the will of the operator.

The base casing or heating unit is provided with a drain outlet 23 which communicates with waste pipe 24. This pipe 24 discharges into drain cock 25. Each adjustable end casing or unit is provided with a drain outlet 26 that is furnished with a drain hose 27. This hose 27 is connected at its outer end to drain cock 25. By means of the drain cock 25, the base heating unit, as well as one of the adjustable end heating units, can be emptied.

On the front or entrance part of the apparatus, I place a horizontal wood guard 28 (Fig. 2). A vertical wood guard 29 is suitably fastened to the central fixed casing or heating unit, whereas vertical wood guards 30 are fastened to the outer ends of the adjustable casing 7, and extend outward over the wood guard 28. These guards 28, 29 and 30 are provided to prevent the operator's hands from coming in contact with the hot metal heating units, whereby burning of the hands is prevented, during the operation of the apparatus.

At the rear or discharge end of the apparatus, I form a wooden slatted platform 31 (Fig. 2). This platform is placed between the angle iron frame 5 and the base heating unit, constituted by said hollow casing 4. The operator places the wrapped bread, with a waxed folded end of the wrapper against the central heating unit and an end heating unit, with the loaf resting on the base heating unit, then upon subsequent loaves so placed, each loaf is pushed through the apparatus onto the slatted platform from whence the sealed loaf is removed, at the will of the operator.

In Fig. 6, I have shown another embodiment of the present invention, in which the base heating unit 1a and the central heating unit 2a are formed of a coiled pipe or metallic tubing of any suitable material. By any common means, the steam can be passed into 2a, at its inlet end 32, with the draining of the coiled tube accomplished at end 33.

The lugs 12 are preferably secured to the inner edge of the hollow casing 4 (Fig. 5).

The apparatus may be placed upon any suitable support, in a shop, and is adapted to receive steam from any suitable source of supply (not shown), with the manipulation of the apparatus fully under the control of the operator. While this apparatus is especially adapted for sealing the wrapper on loaves of bread, still it will equally as well seal wrappers around other articles.

Therefore, while I have described the preferred embodiments of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claim.

What I claim is:

In an apparatus of the class described, the combination of an angle iron frame, a flat hollow heating unit and a slatted platform within and supported by said frame, said heating unit provided with an upstanding hollow central heating unit, plates near the ends of said first mentioned heating unit, said plates extending across said first mentioned heating unit and said platform, said plates provided only above said first mentioned heating unit with upstanding end heating units, each plate provided with a pair of depending threaded extensions between said first mentioned heating unit and said platform, said first mentioned heating unit provided with a pair of lugs contiguous to said platform, threaded rotatable shafts extending through said frame and depending threaded extensions and journalled at their inner ends in said pair of lugs, a wood guard between portions of said frame and against the outer edge of said first mentioned heating unit, wood guards at the outer ends of said central and end heating units, said central and end heating units provided with inlets, and valved tubing connected to said inlets, substantially as shown and described.

JOSEPH W. MOORE.